# United States Patent [19]

Bailey

[11] 3,917,484

[45] Nov. 4, 1975

[54] PHOTOGRAPHIC COMPOSITIONS, ELEMENTS AND PROCESSES FOR THE PRODUCTION OF FORMAZAN DYE IMAGES OF ENHANCED RED ABSORPTION

[75] Inventor: David S. Bailey, Rochester, N.Y.

[73] Assignee: Eastman Kodak Company, Rochester, N.Y.

[22] Filed: Apr. 3, 1974

[21] Appl. No.: 457,960

[52] U.S. Cl. .................................. 96/48 R; 96/88
[51] Int. Cl.$^2$ .......................................... G03C 5/24
[58] Field of Search ...................... 96/48, 88; 252/1

[56] References Cited
FOREIGN PATENTS OR APPLICATIONS
670,883    4/1952    United Kingdom Primary Examiner—Norman G. Torchin
Assistant Examiner—Judson R. Hightower
Attorney, Agent, or Firm—D. M. Schmidt

[57] ABSTRACT

It is disclosed to form a composition of matter comprised of a photoreductant and a tetrazolium salt which includes as a 5-position substituent a benzene ring attached to the tetrazole nucleus having at least one meta or para alkyl or alkoxy substituent and 2- and 3-position tetrazole nucleus substituents which are, collectively, predominantly electronegative. This composition of matter can be contained within a radiation-sensitive image-recording layer of a photographic element. By imagewise exposing the radiation-sensitive layer followed by treating with a base the tetrazolium salt in exposed areas can be converted to a formazan dye of enhanced red absorption characteristics.

21 Claims, No Drawings

PHOTOGRAPHIC COMPOSITIONS, ELEMENTS AND PROCESSES FOR THE PRODUCTION OF FORMAZAN DYE IMAGES OF ENHANCED RED ABSORPTION

This invention relates to an improved photographic composition incorporating a tetrazolium salt having a unique substitution pattern capable of producing a formazan dye which exhibits increased red absorption and, in a preferred form, enhanced stability. In still another aspect, this invention relates to an improved photographic element comprised of a photoreductant and a tetrazolium salt capable of reduction to form a formazan dye image of increased red absorption. In still another aspect this invention relates to a process whereby a visible formazan dye, preferably of enhanced stability, capable of increased red absorption is imagewise produced from a tetrazolium salt precursor upon exposure to actinic radiation.

It is well-known in the photographic art that tetrazolium salts are capable of reduction to formazan dyes. Patent applications bearing Ser. Nos. 384,858; 384,859 and 384,861, filed Aug. 2, 1973, teach the production of formazan dye images incorporating in a radiation-sensitive layer a tetrazolium salt and a photoreductant capable of producing in the presence of labile hydrogen atoms a reducing agent precursor in radiation-struck areas of the layer. An image can be produced in the radiation-sensitive layer by first exposing it to actinic radiation and then bringing it into contact with a base such as ammonia. In a preferred form tetrazolium salts are employed having dye stabilizing tetrazole nucleus substituents which are collectively predominantly electronegative so that the algebraic sum of the Hammett sigma values of the tetrazole nucleus substituents are in excess of 0.78, or, in the alternative, the algebraic sum of the Hammett sigma values of the tetrazole nucleus substituents need only be in excess of 0.40, when the tetrazole nucleus has an aryl substituent which in turn has a single electronegative substituent alpha to the ring-to-nucleus bonding position.

Patent application Ser. No. 403,374, filed Oct. 4, 1973, teaches the use in a radiation-sensitive layer of image-recording compounds capable of changing their radiation absorption characteristics upon reduction. Specifically the invention teaches a process capable of direct image printout using reducible image-recording compounds such as tetrazolium and triazolium salts. A 2H-benzimidazole salt used as a photoreductant in the radiation-sensitive layer is capable of conversion upon exposure in the presence of labile hydrogen atoms to a dihydrobenzimidazole and, through the application of heat, the unexposed 2H-benzimidazole is converted to a light stable 1H-benzimidazole. This fixes the radiation-sensitive layer and prevents any further reaction of the 2H-benzimidazole with the image-recording compound.

Patent application Ser. No. 412,082, filed Nov. 2, 1973, differs from the patent application above in teaching the use of a 1,3-diazabicyclo[3.1.0]hex-3-ene, a photochromic aziridine, as a photoreductant. Upon exposure to actinic radiation the aziridine is converted to a reducing agent precursor. Heating above ambient temperature converts the reducing agent precursor to a reducing agent.

It is an object of this invention to provide a radiation-sensitive composition including tetrazolium salts capable of reduction to formazan dyes of improved red absorption characteristics.

It is an additional object of this invention to provide an image-recording element capable of reduction to a formazan dye of increased red absorption and, in a preferred form, enhanced stability. It is a further object to provide a process for the use of such an image-recording element which results in an image of higher optical density, a more pleasant color and a more neutral hue.

In one aspect this invention is directed to a composition of matter comprised of a photoreductant and a tetrazolium salt capable of reduction to a formazan dye. The tetrazolium salt includes as a 5-position substituent a benzene ring attached to the tetrazole nucleus having at least one meta or para alkyl or alkoxy substituent and 2- and 3-position tetrazole nucleus substituents which are, collectively, predominantly electronegative.

In another aspect this invention is directed to a photographic element having a support and at least one radiation-sensitive image-recording layer thereon comprised of the above-noted composition of matter.

In still another aspect this invention is directed to an image-recording process comprising converting a photoreductant within a selected areal portion of a radiation-sensitive layer of a photographic element to a reducing agent precursor by image-wise exposing the photoreductant to actinic radiation in the presence of labile hydrogen atoms. The precursor is activated with a base to form a reducing agent to allow to be reduced to a formazan dye a tetrazolium salt including as a 5-position substituent a benzene ring attached to the tetrazole nucleus having at least one meta or para alkyl or alkoxy substituent and 2- and 3-position tetrazole nucleus substituents which are, collectively, predominantly electronegative.

This invention adds to the photographic systems described in commonly assigned U.S. Ser. Nos. 384,858; 384,859; 384,861; 403,374 and 412,082, cited above, the further advantages that images of higher optical density, more pleasant color, and more neutral hue can be produced because of the increased red absorption of the formazan dyes. The achievement of more neutral hues can be obtained by means of these formazans alone or in combination with prior art formazans, such as yellow, orange, or red-orange formazan dyes. The tetrazolium salts employed also afford the advantages of backgrounds of a clearer (less yellow) appearance, a greater ease and yield of preparation, and, in a preferred form, enhanced stability over conventional tetrazolium salts used to produce biphenylene bisformazan dyes of a relatively blue hue.

DESCRIPTION OF TETRAZOLIUM SALTS

Numerous tetrazolium salts and processes for their preparation are familiar to those versed in the art. It is also known to those skilled in the art that tetrazolium salts require for preparation the presence of aromatic (e.g., phenyl, naphthyl, anthryl, etc.) or aromatic like (e.g., pyridyl, oxazolyl, thiazolyl, quinolinyl, benzoxazolyl, benzothiazolyl, etc.) substituents in the 2- and 3-position of the tetrazole nucleus. The tetrazolium salts employed in the practice of this invention are further characterized in having a 5-position aromatic substituent which includes a benzene ring attached to the tetrazole nucleus. The 2- and 3-position ring substituents can in turn be substituted, as is well understood in the art. Exemplary of specifically contemplated ring substituents are lower alkyl (i.e., one to six carbon atoms), lower alkenyl (i.e., two to six carbon atoms), lower alkynyl (i.e., two to six carbon atoms), benzyl, styryl, phenyl, biphenyl, naphthyl, alkoxy (e.g., methoxy, ethoxy, etc.), aryloxy (e.g., phenoxy), carboalkoxy (e.g., carbomethoxy, carboethoxy, etc.), carboaryloxy (e.g., carbophenoxy, carbonaphthoxy), acyloxy (e.g., acetoxy, benzoxy, etc.), acyl (e.g., acetyl, benzoyl, etc.), halogen (i.e., fluoride, chloride, bromide, iodide), cyanide, azide, nitro, haloalkyl (e.g., trifluoromethyl, trifluoroethyl, etc.), amino (e.g., dimethylamino), amido (e.g., acetamido, benzamido), ammonium (e.g., trimethylammonium), azo (e.g., phenylazo), sulfonyl (e.g., methylsulfonyl, phenylsulfonyl), sulfoxide (e.g., methylsulfoxide), sulfonium (e.g., dimethyl sulfonium), silane (e.g., trimethylsilane) and thioether (e.g., methyl mercaptide) substituents.

The tetrazolium salts employed in the practice of this invention include as a 5-position substituent to the tetrazole nucleus a benzene ring which in turn has at least one meta or para alkyl or alkoxy substituent. Any alkyl or alkoxy substituent having six carbon atoms or less can be used. Among the exemplary alkyl substituents to the 5-position benzene ring are the following: methyl, ethyl, n-propyl, i-propyl, n-butyl, i-butyl, s-butyl and t-butyl as well as pentyl and hexyl homologues thereof. The corresponding alkoxy substituents are also contemplated, which differ merely by having an oxy linkage between the alkyl group and the meta or para position of the benzene ring. In a variant form the alkyl or alkoxy substituents can be linked to the benzene ring at two locations— e.g., at both a meta and para bonding position. In this form the alkoxy substituent is preferably linked to each bonding position of the benzene ring by an oxy linkage. Exemplary of such substituents are dioxymethylene, dioxyethylene, dioxy-n-propylene, dioxy-2-methyl-n-propylene, trimethylene, tetramethylene, pentamethylene, hexamethylene, etc. In a preferred form the 5-position aromatic substituent is free of electronegative substituents and in a most preferred form includes only one or more of the meta and para alkyl and alkoxy benzene ring substituents.

The tetrazolium salts employed in the practice of this invention are further characterized in that the 2- and 3-position substituents to the tetrazole nucleus are, collectively, predominantly electronegative. Tetrazolium salts which include as a 5-position substituent to the tetrazole nucleus a benzene ring which in turn has at least one meta or para alkyl or alkoxy substituent and which are additionally, collectively, predominantly electronegatively substituted in the 2- and 3-positions of the tetrazole nucleus, produce formazan dyes which exhibit absorption maxima at longer wavelengths than formazan dyes formed from corresponding tetrazolium salts failing to satisfy one or more of these criteria. In a preferred form the 2- and 3-position tetrazole nucleus substituents are both predominantly electro-negatively substituted. When such tetrazolium salts according to my invention are employed, formazan dyes having absorption maxima longer than 500 nanometers in wavelength are produced. I particularly prefer to employ in the practice of my invention tetrazolium salts as above described in which both the 2- and 3-position tetrazole nucleus substituents are each predominantly electronegatively substituted and in which an approximate balance in the electronegativity of the 2- and 3-position substituents is achieved. I have been able to produce formazan dyes of superior absorption characteristics— that is, of longer wavelength absorption maxima—by employing tetrazolium salts according to my invention in which the summed Hammett sigma values of each of the 2- and 3-position substituents are electronegative and differ by less than 0.5. In a specific preferred form the tetrazolium salts of this invention can be chosen so that the 2- and 3-position substituents to the tetrazole nucleus are both electronegative and are identically chosen.

Particularly useful in the practice of this invention ae tetrazolium salts having tetrazole nucleus substituents the algebraic sum of whose Hammett sigma values is collectively greater than 0.78 and, preferably, greater than 1.00. Such tetrazolium salts produce formazan dye images of enhanced stability. Further, if one or more of the substituent rings of the tetrazolium salt is in turn substituted at only one ring position adjacent to the ring-to-nucleus bonding position—i.e., the ring position (or positions) alpha to the bonding position, the algebraic sum of the sigma values for all tetrazole nucleus substituents need only be greater than 0.40 and, preferably, 0.50 in order to achieve the advantages of significantly improved image densities and dye stabilities. When two such alpha position substituents are present in a single substituent ring, however, they are essentially subtractive in effect. For example, two like ortho substituents to a 2,3, or 5-position phenyl ring of a tetrazolium salt are substantially self-cancelling in effect. A comparable tetrazolium salt having only one ortho substituent and having summed Hammett sigma values for all substituents of 0.40 or greater exhibits marked stability. If a 2,3-diphenyl or 2,3,5-triphenyl-2H-tetrazolium salt has no ortho substituents (or cancelling ortho substituents), but has meta and/or para substituents so that the summed sigma values for the phenyl rings are greater than 0.78, then the salt exhibits a marked improvement in its stability. This is more fully disclosed in my earlier filed patent application Ser. No. 384,858, cited above.

Hammett sigma values for the substituents of the tetrazole nucleus can be determined by reference to the published literature or can be determined directly using known determination procedures. Exemplary meta and para sigma values and procedures for their determination are set forth by H. VanBekkum, P. E. Verkade and B. M. Wepster in Rec. Trav. Chim, volume 78, page 815, published 1959; by P. R. Wells in Chem Revs., volume 63, page 171, published 1963, by H. H. Jaffe, Chem. Revs., volume 53, page 191, published 1953; by M. J. S. Dewar and P. J. Grisdale in J. Amer. Chem. Soc., volume 84, page 3548, published 1962; and by Barlin and Perrin in Quart. Revs., volume 20, page 75 et seq., published 1966.

In accordance with established practice, electron withdrawing (electronegative) substituents are assigned positive sigma values while electron donating (electropositive) substituents are assigned negative sigma values. Each tetrazole nucleus substituent is assigned a Hammett sigma value which is the algebriac sum of its unsubstituted sigma value and the sigma value of its own substituents, if any. For example, unsubstituted phenyl tetrazole nucleus substituents have neutral sigma values, while the sigma values of substituted phenyl tetrazole nucleus substituents can be determined algebraically simply by determining from the literature the known Hammett sigma values for each substituent and obtaining the algebraic sum thereof. Other tetrazole nucleus substituents, particularly heterocyclic tetrazole nucleus substituents, can exhibit sigma values even when unsubstituted. For example, a 2-pyridyl substituent exhibits a sigma value of 0.56; a 3-pyridyl substituent exhibits a sigma value of 0.73; a 4-pyridyl substituent exhibits a sigma value of 0.83; a 2-thiazolyl substituent exhibits a sigma value of approximately 0.5; a 2-oxazolyl substituent exhibits a sigma value of 0.75. It is then apparent that a tetrazolium salt including an unsubstituted 4-pyridyl or 2-pyridyl substituent constitutes a preferred, stabilized dye producing tetrazolium salt, provided the remaining tetrazole nucleus substituents are on balance neutral or electronegative in their sigma values.

Sigma values for a given substituent are noted to vary as a function of ring position and resonance induced by conjunction. For example, a given substituent to a phenyl ring can exhibit one sigma value in the meta position and another when in the para position. A few substituents, such as nitro, dimethylamino and cyano substituents, for example, produce a conjugated system as para position substituents to 2 and 3 position phenyl rings and accordingly are assigned differing sigma values depending on the ring to which they are appended. For the purpose of assigning sigma values in accordance with the teachings of this invention the sigma value for an ortho substituent is considered to be identical to the non-conjugated para position sigma value for that substituent. Certain illustrative Hammett sigma values for ring substituents of triphenyltetrazolium salts are set forth in Table I.

Exemplary preferred tetrazolium salts useful in the practice of this invention are set forth in Table II.

TABLE I

| Exemplary Hammett Sigma Values For Triphenyltetrazolium Salt Substituents | | |
|---|---|---|
| Substituent | meta | Ortho/para |
| -N(CH$_3$)$_2$ | +0.05 | +0.12[a] |
| -t-C$_4$H$_9$ | -0.07 | -0.14 |
| -C$_2$H$_5$ | -0.07 | -0.12 |
| -CH$_3$ | -0.07 | -0.13 |
| -OCH$_3$ | +0.08 | -0.17 |
| -Si(CH$_3$)$_3$ | -0.05 | +0.01 |
| -H | ≈0.0 | ≈0.0 |
| -C$_6$H$_5$ | +0.06 | 0.0 |
| -F | +0.34 | +0.08 |
| -Cl | +0.37 | +0.25 |
| -Br | +0.39 | +0.27 |
| -I | +0.35 | +0.30 |
| -CN | +0.62 | +0.65[b] |
| -NO$_2$ | +0.71 | +0.78[c] |
| -C(O)CH$_3$ | +0.38 | +0.50 |
| -SO$_2$CH$_3$ | +0.68 | +0.68 |
| -N(CH$_3$)$_3$$^+$ | +0.86 | +0.80 |
| -CO$_2$CH$_3$ | +0.32 | +0.39 |
| -CHO | +0.38 | +1.00 |
| -SCH$_3$ | +0.22 | +0.22 |
| -S(CH$_3$)$_2$$^+$ | +1.0 | +1.2 |
| -CF$_3$ | +0.47 | +0.53 |

[a] -0.60 for 2 and 3 position phenyl rings as para substituent
[b] +0.75 for 2 and 3 position phenyl rings as para substituent
[c] +0.95 for 2 and 3 position phenyl rings as para substituent

TABLE II

PREFERRED TETRAZOLIUM SALTS USED IN THE PRACTICE OF THIS INVENTION

| | |
|---|---|
| T-1 | 2,3-diphenyl-5-(3-methylphenyl)-2H-tetrazolium chloride |
| T-2 | 2,3-diphenyl-5-(3-n-propylphenyl)-2H-tetrazolium iodide |
| T-3 | 2,3-diphenyl-5-(4-n-hexylphenyl)-2H-tetrazolium hexafluorophosphate |
| T-4 | 2,3-di(4-chlorophenyl)-5-(4-ethylphenyl)-2H-tetrazolium bromide |
| T-5 | 2-(4-nitrophenyl)-3-(2-chlorophenyl)-5-(3-methyl-1-naphthyl)-2H-tetrazolium tetrabromozincate |
| T-6 | 2-(2,3,4-tribromophenyl)-3-(2-nitrophenyl)-5-(4-ethylphenyl)-2H-tetrazolium chloride |

TABLE II-continued

PREFERRED TETRAZOLIUM SALTS USED IN THE PRACTICE OF THIS INVENTION

| | |
|---|---|
| T-7 | 2,3-diphenyl-5-(3-methoxyphenyl)-2H-tetrazolium iodide |
| T-8 | 2-(4-nitrophenyl)-3,5-(4-methoxyphenyl)-2H-tetrazolium tetrafluoroborate |
| T-9 | 2,3-(4-nitrophenyl)-5-(3-n-hexoxyphenyl)-2H-tetrazolium hexafluorophosphate |
| T-10 | 2-(4-nitrophenyl)-3-phenyl-5-(3,4-dimethoxyphenyl)-2H-tetrazolium tetrafluoroborate |
| T-11 | 2,3-di(4-bromophenyl)-5-(4-methoxyphenyl)-2H-tetrazolium tetrafluoroborate |
| T-12 | 2,3-di(4-bromophenyl)-5-(3,4-dimethoxyphenyl)-2H-tetrazolium tetrafluoroborate |
| T-13 | 2,3-di(4-bromophenyl)-5-(3,4,5-trimethoxyphenyl-2-tetrazolium tetrafluoroborate |
| T-14 | 2,3-di(2-iodophenyl)-5-(4-n-propoxyphenyl)-2H-tetrazolium chloride |
| T-15 | 2,3-di(4-nitrophenyl)-5-(4-methoxyphenyl)-2H-tetrazolium tetrafluoroborate |
| T-16 | 2-(2,5-dichlorophenyl)-3-(4-cyanophenyl)-5-(4-methoxyphenyl)-2H-tetrazolium tetrafluoroborate |
| T-17 | 2-(2,5-dichlorophenyl)-3-(4-nitrophenyl)-5-(4-methoxyphenyl)-2H-tetrazolium tetrafluoroborate |
| T-18 | 2-(2,4,5-trichlorophenyl)-3-(4-nitrophenyl)-5-(4-methoxyphenyl)-2H-tetrazolium tetrafluoroborate |
| T-19 | 2,3-di(2,5-dichlorophenyl)-5-(4-methoxyphenyl)-2H-tetrazolium tetrafluoroborate |
| T-20 | 2-(2,5-dichlorophenyl)-3-(2-methoxy-4-nitrophenyl)-5-(4-methoxyphenyl)-2H-tetrazolium tetrafluororate |
| T-21 | 2-(2,5-dichlorophenyl)-3-(2-iodophenyl)-5-(3-n-butoxyphenyl)-2H-tetrazolium perchlorate |
| T-22 | 2,3-di(4-nitrophenyl)-5-(4-neopentoxyphenyl)-2H-tetrazolium sulfate |
| T-23 | 2,3-diphenyl-5-(3,4-dioxymethylenephenyl)-2H-tetrazolium bromide |
| T-24 | 2,3-di(4-bromophenyl)-5-(3,4-dioxymethylenephenyl)-2H-tetrazolium tetrafluoroborate |
| T-25 | 2,3-di(2,5-dichlorophenyl)-5-(3,4-dioxymethylenephenyl)-2H-tetrazolium tetrafluoroborate |
| T-26 | 2-(4-nitrophenyl)-3-(4-iodophenyl)-5-(3,4-dioxyethylenephenyl)-2H-tetrazolium chloride |
| T-27 | 2,3-di(2,5-dichlorophenyl)-5-(3,4-dioxyhexamethylenephenyl)-2H-tetrazolium iodide |
| T-28 | 2-(4-nitrophenyl)-3,5-di(3,4-dioxymethylenephenyl)-2H-tetrazolium hexafluorophosphate |
| T-29 | 2,3,5-tri(3,4-dioxymethylenephenyl)-2H-tetrazolium sulfate |
| T-30 | 2-phenyl-3-(4-iodo-2-nitrophenyl)-5-(3,4-dioxytetramethylenephenyl)-2H-tetrazolium chloride |
| T-31 | 2,3-diphenyl-5-(3,4-trimethylenephenyl)-2H-tetrazolium bromide |
| T-32 | 2-(4-nitrophenyl)-3-(4-iodophenyl)-5-(3,4-hexamethylenephenyl)-2H-tetrazolium hexafluorophosphate |

DESCRIPTION OF PHOTOREDUCTANTS

As employed herein, the term "photoreductant" designates a material capable of molecular photolysis or photo-induced rearrangement to generate a reducing agent or a reducing agent precursor. The term "reducing aagent precursor" designates a compound which is not capable of reducing a tetrazolium salt employed in combination therewith, but which can be activated by a base or by heat to become a reducing agent capable of reducing the tetrazolium salt.

Exemplary of the photoreductants which form base activated reducing agent precursors and which can be utilized in the practice of this invention are disulfides capable of being photolytically cleaved at the S-S bond to form a mercaptan in the presence of labile atoms. A variety of such disulfides are known in the art. It is preferred to employ hydrocarbon disulfides and, more specifically, aryl disulfides. The aryl disulfides preferred are the alkyl aryl disulfides having from 1 to 20 (preferably 1 to 6) alkyl carbon atoms and diaryl disulfides. Either single or fused aromatic ring structures can be employed—e.g., phenyl, naphthyl, anthryl and similar ring structures. It is also contemplated that aromatic disulfides that incorporate non-basic heterocyclic aromatic rings can be utilized. Typical of such disulfides are those incorporating 5 and 6 membered aromatic rings having oxygen and/or sulfur heteroatoms.

In addition to the disulfides set forth above, phenazinium salts can be utilized as photoreductants in the practice of this invention. Also useful as photoreductants are diazoanthrones, β-ketosulfides and nitroarenes. The arene ring can be any aromatic carbocyclic ring structure—e.g., phenyl, naphthyl, anthryl and similar ring structures. It is specifically contemplated that the nitroarenes can incorporate substituents having labile hydrogen atoms and that these labile hydrogen atoms can be used in converting the photoreductant to a reducing agent precursor. For example, the nitroarenes can incorporate hydroxyalkyl substitutents to provide labile hydrogen atoms.

Specific exemplary disulfides, phenazinium salts, diazoanthrones, β-ketosulfides and nitroarenes are set forth in Table III. All of these photoreductants form base activatible reducing agent precursors on exposure.

TABLE III

| | Exemplary Photoreductants |
|---|---|
| PR- 1 | 2-nitrobenzyl alcohol |
| PR- 2 | 4-bromonitrobenzene |
| PR- 3 | 2-(1-hydroxyethyl)-1-nitronaphthalene |
| PR- 4 | 2-nitroanthracene |
| PR- 5 | 4-hexoxynitrobenzene |
| PR- 6 | 2,5-diethoxynitrobenzene |
| PR- 7 | 2-nitronaphthalene |
| PR- 8 | 2-ethoxy-1-nitronaphthalene |
| PR- 9 | 2-isopropylnitrobenzene |
| PR-10 | 2-benzylnitrobenzene |
| PR-11 | 1-methyl-4-nitropyridinium tetrafluoroborate |
| PR-12 | 1-naphthyl-1'-phenethyl disulfide |
| PR-13 | β-naphthyl disulfide |
| PR-14 | 9-anthryl disulfide |
| PR-15 | cyclohexyl 2-naphthyl disulfide |
| PR-16 | diphenylmethyl 2-naphthyl disulfide |
| PR-17 | 2-dodecyl 1'-naphthyl disulfide |
| PR-18 | 4,4'-dihexyldiphenyl disulfide |
| PR-19 | 2,2'-bis(hydroxymethyl)diphenyl disulfide |
| PR-20 | 4,4'-dinitrodiphenyl disulfide |
| PR-21 | 3-phenyl-3H-naphtho[1,2-c]-1,2-dithiole |
| PR-22 | phenazinium 4-toluenesulfonate |
| PR-23 | N-methyl phenazinium bromide |
| PR-24 | 2-methoxyphenazinium hexafluorophosphate |
| PR-25 | 2-nitrophenazinium tetrafluoroborate |
| PR-26 | 1-(hydroxymethyl)phenazinium chloride |
| PR-27 | 1-isopropoxy-10-methylphenazinium tetrafluoroborate |
| PR-28 | 2,3,9-trimethylphenazinium chloride |
| PR-29 | 2,3-dimethyl-5-nitrophenazinium methyl sulfate |
| PR-30 | 2,3-dichlorophenazinium chloride |
| PR-31 | 2-cyanophenazinium tetrafluoroborate |
| PR-32 | 1,2-benzophenazinium 4-toluenesulfonate |
| PR-33 | 10-diazoanthrone |
| PR-34 | 2-methoxy-10-diazoanthrone |
| PR-35 | 3-nitro-10-diazoanthrone |
| PR-36 | 3,6-diethoxy-10-diazoanthrone |
| PR-37 | 3-chloro-10-diazoanthrone |
| PR-38 | 4-ethoxy-10-diazoanthrone |
| PR-39 | 4-(1-hydroxyethyl)-10-diazoanthrone |
| PR-40 | 2,7-diethyl-10-diazoanthrone |
| PR-41 | 2-(4-tolyl)thiochromanone |
| PR-42 | 7-methyl-2-tolylthiochromanone |
| PR-43 | 2-(2,4,6-trimethylphenylthio)-1-tetralone |
| PR-44 | 2-benzylthio-1-tetralone |
| PR-45 | 2-(4-tolyl)thio-1-tetralone |
| PR-46 | 4-tolylthioacetone |
| PR-47 | 3-phenyl-2-(4-tolyl)thiopropiophenone |
| PR-48 | 2-ethylthio-3-phenylpropiophenone |
| PR-49 | 3-phenyl-2-phenylthiopropiophenone |
| PR-50 | 3-phenyl-1-(4-tolyl)thio-2'-propionaphthone |
| PR-51 | 4'-methoxy-3-phenyl-2-phenylthiopropiophenone |
| PR-52 | 3,3-diphenyl-2-phenylthiopropiophenone |

QUINONE PHOTOREDUCTANTS

Quinones are further exemplary of photoreductants which form base activatible reducing agent precursors. Useful quinones include ortho and para-benzoquinones, diphenoquinones, ortho and para-naphthoquinones, phenanthrenequinones and anthraquinones. The quinones may be unsubstituted or incorporate any substituent or combination of substituents that do not interfere with the conversion of the quinone to the corresponding reducing agent precursor—e.g., hydroquinone. A variety of such substituents are known to the art and include, but are not limited to, primary, secondary and tertiary alkyl, alkenyl and alkynyl, aryl, alkoxy, aryloxy, aralkoxy, alkaryloxy, hydroxyalkyl, hydroxyalkoxy, alkoxyalkyl, acyloxyalkyl, aryloxyalkyl, aroyloxyalkyl, aryloxyalkoxy, alkylcarbonyl, carboxyl, primary and secondary amino, aminoalkyl, amidoalkyl, anilino, piperidino, pyrrolidino, morpholino, nitro, halide and other similar substituents. Such aryl substituents are preferably phenyl substituents and such alkyl, alkenyl and alkynyl substituents, whether present as sole substituents or present in combination with other atoms, typically incorporate twenty (preferably six) or fewer carbon atoms.

Specific exemplary quinones intended to be used in combination with a separate source of labile hydrogen atoms are set forth in Table IV.

TABLE IV

| | Exemplary Quinones Useful with External Hydrogen Source |
|---|---|
| PR-53 | Anthraquinone |
| PR-54 | 2-Methylanthraquinone |
| PR-55 | 2-t-Butylanthraquinone |
| PR-56 | 1,4-Dimethylanthraquinone |
| PR-57 | 2-Piperidinoanthraquinone |
| PR-58 | 2-Methyl-1,4-anthraquinone |
| PR-59 | 1-(N-methyl)aminoanthraquinone |
| PR-60 | 2,5-Dimethyl-1,4-benzoquinone |
| PR-61 | Phenanthrenequinone |
| PR-62 | Duroquinone |
| PR-63 | 2,5-Di-t-butyl-1,4-benzoquinone |
| PR-64 | 2-Methyl-1,4-benzoquinone |
| PR-65 | 2,3,5-Trimethyl-6-bromo-1,4-benzoquinone |
| PR-66 | 2-Phenyl-1,4-benzoquinone |
| PR-67 | 1,4-Naphthoquinone |
| PR-68 | 2-Methyl-1,4-naphthoquinone |
| PR-69 | 2,3-Dimethyl-1,4-naphthoquinone |
| PR-70 | 2,3-Dichloro-1,4-naphthoquinone |
| PR-71 | 2-Thiomethyl-1,4-naphthoquinone |
| PR-72 | 2-Methyl-3-(methylthio)-1,4-naphthoquinone |
| PR-73 | 2,3-Dithiomethyl-1,4-naphthoquinone |
| PR-74 | 2-Amino-3-chloro-1,4-naphthoquinone |
| PR-75 | 2-(Acetylthiomethyl)-3-methyl-1,4-naphthoquinone |

2H-BENZIMIDAZOLE PHOTOREDUCTANTS

This invention may also employ a 2H-benzimidazole as a photoreductant. Although it is contemplated that the 2H-benzimidazoles useful in the practice of this invention can include those having electron withdrawing substituents, such as halogen atoms, cyano groups, carboxy groups, nitro groups, carbonyl containing groups and the like, it is preferred to employ 2H-benzimidazoles which incorporate one or more electron donating substituents, since electron donating substituents increase the ease with which the dihydrobenzimidazoles produced from 2H-benzimidazoles on exposure are oxidized. Illustrative of electron donating substituents are hydroxy groups; alkoxy groups; primary, secondary and tertiary amino groups — e.g., amino, alkylamino, dialkylamino, arylamino, diarylamino, aralkylamino, diarlkylamino, morpholino, piperidino, and the like; alkylazo; alkenyl; styryl; and the like. It is generally preferred that the alkyl substituents and substituents moieties have 20 or fewer carbon atoms, most preferably six or fewer carbon atoms. The aryl substituents and substituent moieties are preferably phenyl groups.

Exemplary 2H-benzimidazole photoreductants are set forth below in Table V.

are those which have a hydrogen atom bonded to a carbon atom to which is also bonded the oxygen atom of an oxy substituent and/or the trivalent nitrogen atom of an amine substituent. As employed herein the term "amine substituent" is inclusive of amide and imine substituents. Exemplary preferred substituents which produce marked lability in a hydrogen atom associated with a common carbon atom are oxy substituents, such as hydroxy, alkoxy, aryloxy, alkaryloxy and aralkoxy substituents and amino substituents, such as alkylarylamino, diarylamino, amido, N,N-bis(1-cyanoalkyl)amino, N-aryl-N-(1-cyanoalkyl)amino, N-alkyl-N-(1-cyanoalkyl)amino, N,N-bis(1-carbalkoxyalkyl)amino, N-aryl-N-(1-carbalkoxyalkyl)amino, N-alkyl-N-(1-carbalkoxyalkyl)amino, N-N-bis-(1-nitroalkyl)amino, N-alkyl-N-(1-nitroakyl)amino, N-

Table V

| | EXEMPLARY 2H-BENZIMIDAZOLE PHOTOREDUCTANTS | | |
|---|---|---|---|
| PR-76 | 2,2-dimethyl-2H-benzimidazole | PR-89 | 5-methylspiro(2H-benzimidazole-2,1'-cyclohexane) |
| PR-77 | 2,2-diethyl-2H-benzimidazole | PR-90 | 5,6-dimethylspiro(2H-benzimidazole-2,1'-cyclohexane) |
| PR-78 | 2,2-di-n-hexyl-2H-benzimidazole | | |
| PR-79 | spiro(2H-benzimidazole-2,1'-cyclohexane) | PR-91 | 5,5''-dimethyldispiro(2H-benzimidazole-2,1'-cyclohexane-4',2''-2H-benzimidazole) |
| PR-80 | dispiro(2H-benzimidazole-2,1'-cyclohexane-4',2''-2H-benzimidazole) | PR-92 | 5,6,5'',6''-tetramethyldispiro(2H-benzimidazole-2,1'-cyclohexane-4',2''-2H-benzimidazole |
| PR-81 | 2,2-diphenyl-2H-benzimidazole | PR-93 | 4-bromo-2,2-dimethyl-2H-benzimidazole |
| PR-82 | 2,2-diphenyl-2H-benzimidazole | PR-94 | 5-iodo-2,2-dimethyl-2H-benzimidazole |
| PR-83 | 2,2-dimethyl-4-n-butyl-2H-benzimidazole | PR-95 | 5-chlorospiro(2H-benzimidazole-2,1'-cyclohexane) |
| PR-84 | 2,2-diphenyl-5-n-hexyl-2H-benzimidazole | | |
| PR-85 | 2'-methylspiro(2-benzimidazole-2,1'-cyclohexane) | PR-96 | 4-fluorospiro(2H-benzimidazole-2,1'-cyclohexane) |
| PR-86 | 3'-methylspiro(2H-benzimidazole-2,1'-cyclohexane) | PR-97 | 2,2-diethyl-4-trichloromethyl-2H-benzimidazole |
| PR-87 | 4'-methylspiro(2H-benzimidazole-2,1'-cyclohexane) | PR-98 | 2,2-diphenyl-4-trifluoromethyl-2H-benzimidazole |
| PR-88 | 2',6'-dimethylspiro(2H-benzimidazole-2,1'-cyclohexane) | PR-99 | 2',3',4',5',6'-pentachlorospiro(2H-benzimidazole-2,1'-cyclohexane) |
| PR-100 | 5-trifluoromethylspiro(2H-benzimidazole-2,1'-cyclohexane) | PR-113 | 2,2-dimethyl-5-(N-phenylamino)-2H-benzimidazole |
| PR-101 | 2,2-dibenzyl-4-methoxy-2H-benzimidazole | PR-114 | 2,2-dimethyl-5-(N-tolylamino)-2H-benzimidazole |
| PR-102 | 2,2-diethyl-4-isopropoxy-2H-benzimidazole | PR-115 | 4-(N,N-diphenylamino)spiro(2H-benzimidazole-2,1'-cyclohexane) |
| PR-103 | 2,2-diethyl-5-ethoxy-2H-benzimidazole | PR-116 | 4-(N-phenylamino)spiro(2H-benzimidazole-2,1'-cyclohexane) |
| PR-104 | 5-methoxyspiro(2H-benzimidazole-2,1'-cyclohexane) | | |
| PR-105 | 4-ethoxyspiro(2H-benzimidazole-2,1'-cyclohexane) | PR-117 | 2'-morpholinospiro(2H-benzimidazole-2,1'-cyclohexane) |
| PR-106 | 5-isopropoxyspiro(2H-benzimidazole-2,1'-cyclohexane) | PR-118 | (2,2-diphenyl-4-piperidino-2H-benzimidazole |
| | | PR-119 | 2,2-diphenyl-5-methylazo-2H-benzimidazole |
| PR-107 | 2'-methoxyspiro(2H-benzimidazole-2,1'-cyclohexane) | PR-120 | 2'-methylazospiro(2H-benzimidazole-2,1'-cyclohexane) |
| PR-108 | 3'-neopentoxyspiro(2H-benzimidazole-2,1'-cyclohexane) | PR-121 | 2,2-dimethyl-5-styryl-2H-benzimidazole |
| PR-109 | 4,4'-dimethoxydispiro(2H-benzimidazole-2,1'-cyclohexane-4',2''-2H-benzimidazole) | PR-122 | 2,2-dimethyl-4-vinyl-2H-benzimidazole |
| PR-110 | 5,5''-diisopropoxy-2'-methoxydispiro(2H-benzimidazole-2,1'-cyclohexane-4',2''-2H-benzimidazole) | PR-123 | 5-vinylspiro(2H-benzimidazole-2,1'-cyclohexane) |
| | | PR-124 | 2,2-diphenyl-5-nitro-2H-benzimidazole |
| PR-111 | 2,2-dimethyl-4-amino-2H-benzimidazole | PR-125 | 5-carbomethoxyspiro(2H-benzimidazole-2,1'-cyclohexane) |
| PR-112 | 2,2-dimethyl-4-(N,N-dimethylamino)-2H-benzimidazole | | |

HYDROGEN SOURCE COMPOUNDS

Any conventional source of labile hydrogen atoms that is not otherwise reactive with the remaining components or their reaction products contained within the photographic element can be utilized in combination with any of the photoreductants described above. Generally preferred for use are organic compounds having a hydrogen atom attached to a carbon atom to which a substituent is also attached which greatly weakens the carbon to hydrogen bond, thereby rendering the hydrogen atom labile. Preferred hydrogen source compounds aryl-N-(1-nitroalkyl)amino, N,N-bis(1-acylalkyl)amino, N-alkyl-N-(1-acylalkyl)amino, N-aryl-N-(1-acylalkyl)amino, and the like. The aryl substituents and substituent moieties are preferably phenyl or phenylene while the aliphatic hydrocarbon substituents and substituent moieties preferably incorporate twenty or fewer carbon atoms and, most preferably, six or fewer carbon atoms. Exemplary of compounds which can be used in the practice of this invention for the purpose of providing a ready source of labile hydrogen atoms are those set forth in Table VI.

Table VI

EXEMPLARY EXTERNAL HYDROGEN SOURCE COMPOUNDS

| | |
|---|---|
| HS- 1 | poly(ethylene glycol) |
| HS- 2 | phenyl-1,2-ethanediol |
| HS- 3 | nitrilotriacetonitrile |
| HS- 4 | triethylnitrilotriacetate |
| HS- 5 | poly(ethylene glycol) |
| HS- 6 | poly(vinyl butyral) |
| HS- 7 | poly(vinyl acetal) |
| HS- 8 | 1,4-benzenedimethanol |
| HS- 9 | methyl cellulose |
| HS-10 | cellulose acetate butyrate |
| HS-11 | 2,2-bis-(hydroxymethyl)-propionic acid |
| HS-12 | 1,3-bis-(hydroxymethyl)-urea |
| HS-13 | 4-nitrobenzyl alcohol |
| HS-14 | 4-methoxybenzyl alcohol |
| HS-15 | 2,4-dimethoxybenzyl alcohol |
| HS-16 | 3,4-dichlorophenylglycol |
| HS-17 | N-(hydroxymethyl)-benzamide |
| HS-18 | N-(hydroxymethyl)-phthalimide |
| HS-19 | 5-(hydroxymethyl)-uracil hemihydrate |
| HS-20 | nitrilotriacetic acid |
| HS-21 | 2,2',2''-triethylnitrilotripropionate |
| HS-22 | 2,2',2''-nitrilotriacetophenone |
| HS-23 | poly(vinyl acetate) |
| HS-24 | poly(vinyl alcohol) |
| HS-25 | ethyl cellulose |
| HS-26 | carboxymethyl cellulose |
| HS-27 | poly(vinyl formal) |

Compound known to be useful in providing labile hydrogen atoms are also disclosed in U.S. Pat. No. 3,383,212, issued May 14, 1968, the disclosure of which is here incorporated by reference.

The compounds of Table VI capable of providing labile hydrogen atoms are referred to as external hydrogen source compounds. The external hydrogen source compounds are incorporated within the photographic elements in combination with the above described photoreductants to facilitate their conversion to reducing agents and reducing agent precursors. They can, in fact, perform more than one function. For example, the external hydrogen source polymers of Table VI can also be used as binders as well as to provide a source of labile hydrogen atoms. These compounds are designated as external hydrogen source compounds only to point up that the labile hydrogen atoms are not incorporated in the photoreductant.

INTERNAL HYDROGEN SOURCE PHOTOREDUCTANTS

As specifically noted above in connection with useful nitroarenes, the photoreductants can themselves incorporate labile hydrogen atoms which facilitate their conversion to reducing agent precursors. Such photoreductants are herein referred to as "internal hydrogen source photoreductants."

It has been discovered that quinones incorporating labile hydrogen atoms are more easily photoreduced than quinones which do not incorporate labile hydrogen atoms. Even when quinones lacking labile hydrogen atoms are employed in combination with an external hydrogen source while incorporated hydrogen source quinones are similarly employed without external hydrogen source compounds, the internal hydrogen source quinones continue to exhibit greater ease of photoreduction. When internal hydrogen source quinones are employed with external hydrogen source compounds, their ease of photoreduction can generally be further improved, although the improvement is greater for those internal hydrogen source quinones which are less effective when employed without an external hydrogen source compound.

Using quinones exhibiting greater ease of photoreduction results in photographic elements which exhibit improved image densities for comparable exposures and which provides comparable image densities with lesser exposure times. Hence, incorporated hydrogen source quinones can be employed to achieve greater photographic speeds and/or image densities.

Particularly preferred internal hydrogen source quinones are 5,8-dihydro-1,4-naphthoquinones having at least one hydrogen atom in each of the 5 and 8 ring positions. Other preferred incorporated hydrogen source quinones are those which have a hydrogen atom bonded to a carbon atom to which is also bonded the oxygen atom of an oxy substituent or a nitrogen atom of an amine substituent with the further provision that the carbon to hydrogen bond is the third or fourth bond removed from at least one quinone carbonyl double bond. As employed herein the term "amine substituent" is inclusive of amide and imine substituents. Disubstituted amino substituents are preferred. 1,4-benzoquinones and naphthoquinones having one or more 1' or 2'-hydroxyalkyl, alkoxy (including alkoxyalkoxy—particularly 1' or 2'-alkoxyalkoxy, hydroxyalkoxy, etc.), 1' or 2'-alkoxyalkyl, aralkoxy, 1' or 2'-acyloxyalkyl, 1' or 2'-aryloxyalkyl, aryloxyalkoxy, 1' or 2'-aminoalkyl (preferably a 1' or 2'-aminoalkyl in which the amino group contains two substituents in addition to the alkyl substituent, at least one of which is an electronegative or aryl substituent, 1' or 2'-aroyloxyalkyl, alkylarylamino, dialkylamino, N,N-bis-(1-cyanoalkyl)amino, N-aryl-N-(1-cyanoalkyl)amino, N-alkyl-N-(1-cyanoalkyl)amino, N,N-bis(1-carbalkoxyalkyl)amino, N-aryl-N-(1-carbalkoxyalkyl)amino, N-alkyl-N-(1-carbalkoxyalkyl)amino, N,N-bis(1-nitroalkyl)amino, N-alkyl-N-(1-nitroalkyl)amino, N-aryl-N-(1-nitroalkyl)amino, N,N-bis(1-acylalkyl)amino, N-alkyl-N-(1-acylalkyl)amino, N-aryl-N-(1-acylalkyl)amino, pyrrolino, pyrrolidino, piperidino, and/or morpholino substituents in the 2 and/or 3 position are particularly preferred. Other substituents can, of course, be present. Unsubstituted 5,8-dihydro-1,4-naphthoquinone and 5,8-dihydro-1,4-naphthoquinones substituted at least in the 2 and/or 3 position with one or more of the above-listed preferred quinone substituents also constitute preferred internal hydrogen source quinones. It is recognized that additional fused rings can be present within the incorporated hydrogen source quinones. For example, 1,4-dihydro-anthraquinones represent a useful species of 5,8-dihydro-1,4-naphthoquinones useful as incorporated hydrogen source quinones. The aryl substituents and substituent moieties of incorporated hydrogen source quinones are preferably phenyl or phenylene while the aliphatic hydrocarbon substituents and substituent moieties preferably incorporate twenty or fewer carbon atoms and, most preferably, six or fewer carbon atoms. Exemplary preferred internal hydrogen source quinones are set forth in Table VII.

TABLE VII

| Exemplary Internal Hydrogen Source Quinones | |
|---|---|
| PR-126 | 5,8-dihydro-1,4-naphthoquinone |
| PR-127 | 5,8-dihydro-2,6,7-trimethyl-1,4-naphthoquinone |
| PR-127 | 5,8-dihydro-6,7-dimethyl-2-phenyl-1,4-naphthoquinone |
| PR-128 | 5,8-dihydro-2,5,8-trimethyl-1,4-naphthoquinone |
| PR-129 | 2,5-bis(dimethylamino)-1,4-benzoquinone |
| PR-130 | 2,5-dimethyl-3,6-bis(dimethylamino)-1,4-benzoquinone |

TABLE VII-continued

Exemplary Internal Hydrogen Source Quinones

| | |
|---|---|
| PR-131 | 2,5-dimethyl-3,6-bispyrrolidino-1,4-benzoquinone |
| PR-132 | 2-ethoxy-5-methyl-1,4-benzoquinone |
| PR-133 | 2,6-dimethoxy-1,4-benzoquinone |
| PR-134 | 2,5-dimethoxy-1,4-benzoquinone |
| PR-135 | 2,6-diethoxy-1,4-benzoquinone |
| PR-136 | 2,5-diethoxy-1,4-benzoquinone |
| PR-137 | 2,5-bis(2-methoxyethoxy)-1,4-benzoquinone |
| PR-138 | 2,5-bis(β-phenoxyethoxy)-1,4-benzoquinone |
| PR-139 | 2,5-diphenethoxy-1,4-benzoquinone |
| PR-140 | 2,5-di-n-propoxy-1,4-benzoquinone |
| PR-141 | 2,5-di-isopropoxy-1,4-benzoquinone |
| PR-142 | 2,5-di-n-butoxy-1,4-benzoquinone |
| PR-143 | 2,5-di-sec-butoxy-1,4-benzoquinone |
| PR-144 | 2-(N-ethylacetamidomethyl)-5-tert-butyl-1,4-benzoquinone |
| PR-145 | bis[2-(5-methyl-1,4-benzoquinone-2-yl)ethyl] ether |
| PR-146 | 2-methyl-5-morpholinomethyl-1,4-benzoquinone |
| PR-147 | 2,3,5-trimethyl-6-morpholinomethyl-1,4-benzoquinone |
| PR-148 | 2,3-dimethyl-6-morpholinomethyl-1,4-benzoquinone |
| PR-149 | 2,5-bis(morpholinomethyl)-1,4-benzoquinone |
| PR-150 | 2-(1-hydroxy-2-methyl-n-propyl)-5-methyl-1,4-benzoquinone |
| PR-151 | 2-hydroxymethyl-3,5,6-trimethyl-1,4-benzoquinone |
| PR-152 | 2-(1-hydroxyethyl)-5-methyl-1,4-benzoquinone |
| PR-153 | 2-(1-hydroxy-n-propyl)-5-methyl-1,4-benzoquinone |
| PR-154 | 2-(1-hydroxy-n-octyl)-5-methyl-1,4-benzoquinone |
| PR-155 | 2-(1,1-dimethyl-2-hydroxyethyl)-5-methyl-1,4-benzoquinone |
| PR-156 | 2-(1-acetoxyethyl)-5-methyl-1,4-benzoquinone |
| PR-157 | 2-(1-methoxyethyl)-5-methyl-1,4-benzoquinone |
| PR-158 | 2-(1-ethoxyethyl)-5-methyl-1,4-benzoquinone |
| PR-159 | 2-(1-isopropoxyethyl)-5-methyl-1,4-benzoquinone |
| PR-160 | 2-chloro-3-n-octylamino-1,4-naphthoquinone |
| PR-161 | 1,4-dihydro-1,4-dimethylanthraquinone |
| PR-162 | 1,4-dihydro-2,3-dimethylanthraquinone |
| PR-163 | 2-dimethylamino-1,4-naphthoquinone |
| PR-164 | 2-methoxy-1,4-naphthoquinone |
| PR-165 | 2-benzyloxy-1,4-naphthoquinone |
| PR-166 | 2-methoxy-3-chloro-1,4-naphthoquinone |
| PR-167 | 2,3-dimethoxy-1,4-naphthoquinone |
| PR-168 | 2,3-diethoxy-1,4-naphthoquinone |
| PR-169 | 2-ethoxy-1,4-naphthoquinone |
| PR-170 | 2-phenethoxy-1,4-naphthoquinone |
| PR-171 | 2-(2-methoxyethoxy)-1,4-naphthoquinone |
| PR-172 | 2-(2-ethoxyethoxy)-1,4-naphthoquinone |
| PR-173 | 2-(2-phenoxy)ethoxy-1,4-naphthoquinone |
| PR-174 | 2-ethoxy-5-methoxy-1,4-naphthoquinone |
| PR-175 | 2-ethoxy-6-methoxy-1,4-naphthoquinone |
| PR-176 | 2-ethoxy-7-methoxy-1,4-naphthoquinone |
| PR-177 | 2-n-propoxy-1,4-naphthoquinone |
| PR-178 | 2-(3-hydroxypropoxy)-1,4-naphthoquinone |
| PR-179 | 2-isopropoxy-1,4-naphthoquinone |
| PR-180 | 7-methoxy-2-isopropoxy-1,4-naphthoquinone |
| PR-181 | 2-n-butoxy-1,4-naphthoquinone |
| PR-182 | 2-sec-butoxy-1,4-naphthoquinone |
| PR-183 | 2-n-pentoxy-1,4-naphthoquinone |
| PR-184 | 2-n-hexoxy-1,4-naphthoquinone |
| PR-185 | 2-n-heptoxy-1,4-naphthoquinone |
| PR-186 | 2-acetoxymethyl-3-methyl-1,4-naphthoquinone |
| PR-187 | 2-methoxymethyl-3-methyl-1,4-naphthoquinone |
| PR-188 | 2-(β-acetoxyethyl)-1,4-naphthoquinone |
| PR-189 | 2-N,N-bis(cyanomethyl)aminomethyl-3-methyl-1,4-naphthoquinone |
| PR-190 | 2-methyl-3-morpholinomethyl-1,4-naphthoquinone |
| PR-191 | 2-hydroxymethyl-1,4-naphthoquinone |
| PR-192 | 2-hydroxymethyl-3-methyl-1,4-naphthoquinone |
| PR-193 | 2-(1-hydroxyethyl)-1,4-naphthoquinone |
| PR-194 | 2-(2-hydroxyethyl)-1,4-naphthoquinone |
| PR-195 | 2-(1,1-dimethyl-2-hydroxyethyl)-1,4-naphthoquinone |
| PR-196 | 2-bromo-3-isopropoxy-1,4-naphthoquinone |
| PR-197 | 2-ethoxy-3-methyl-1,4-naphthoquinone |
| PR-198 | 2-chloro-3-piperidino-1,4-naphthoquinone |
| PR-199 | 2-morpholino-1,4-naphthoquinone |
| PR-200 | 2,3-dipiperidino-1,4-naphthoquinone |

AZIRIDINE PHOTOREDUCTANTS

In addition to photoreductants which require the presence of labile hydrogen atoms, either internally or externally located, it is possible to employ a photoreductant whose conversion to a reducing agent is independent of the availability of labile hydrogen atoms. Exemplary of such photoreductants are aziridines, such as 1,3-diazabicyclo[3.1.0]hex-3-enes, capable of forming successively reducing agent precursors and reducing agents upon exposure to actinic radiation and heat.

Since the photoresponse of 1,3-diazabicyclo[3.1.0]hex-3-enes is primarily a function of the ring structure, any known compound of this type can be used in the practice of this invention. 1,3-diazabicyclo[3.1.0]hex-3-enes are known having various combinations of substituents. Typical of the 1,3-diazabicyclo[3.1.0]hex-3-enes useful in the practice of this invention are those defined by the formula (II)

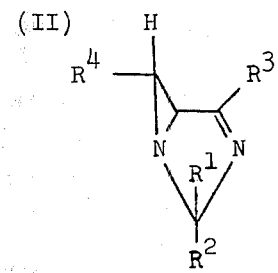

(II)

wherein $R^1$ and $R^2$ are independently chosen from among such substituents as hydrogen, alkyl (including cycloalkyl), aralkyl, alkaryl and aryl substituents or together $R^1$ and $R^2$ constitute an alkylene substituent, preferably forming a 5- or 6-membered ring;

$R^3$ is an aryl or electron withdrawing substituent, such as a cyano group, a carboxy group, a nitro group or a carbonyl-containing group; and $R^4$ is an aryl or alkaryl substituent.

In alternative 1,3-diazabicyclo[3.1.0]hex-3-enes according to this invention the nitrogen atom in ring position 1 (the nitrogen atom common to both rings) can be converted to form the corresponding quaternary salt or N-oxide. When the 1 position nitrogen atom is quaternized it can bear an alkyl or aralkyl substituent or hydrogen. The alkyl and aryl substituents and substituent moieties can be further substituted—e.g., mono- or di-substituted. Typical aryl and alkyl substituents contemplated include alkyl, benzyl, styryl, phenyl, biphenylyl, naphthyl, alkoxy (e.g., methoxy, ethoxy, etc.), aryloxy (e.g., phenoxy), carboalkoxy (e.g., carbomethoxy, carboethoxy, etc.), carboaryloxy (e.g., carbophenoxy, carbonaphthoxy), acyloxy (e.g., acetoxy, benzoxy, etc.), acyl (e.g., acetyl, benzoyl, etc.), halogen (i.e., fluoride, chloride, bromide, iodide), cyano, azido, nitro, haloalkyl (e.g., trifluoromethyl, trifluoroethyl, etc.), amino (e.g., dimethylamino), amido (e.g., acetamido, bezamido, etc.), ammonium (e.g., trimethylammonium), azo (e.g., phenylazo), sulfonyl (e.g., methylsulfonyl, phenylsulfonyl), sulfoxy (e.g., methylsulfoxy), sulfonium (e.g., dimethyl sulfonium), silyl (e.g., trimethylsilyl) and thioether (e.g., methylthio) substituents. It is generally preferred that alkyl and alkylene substituents and substituent moieties having 20 or fewer carbon atoms, most preferably six or fewer carbon atoms, be employed. The aryl substituents and substituent moieties are preferably phenyl or naphthyl groups.

Exemplary 1,3-diazabicyclo[3.1.0]hex-3-ene photoreductants are set forth below in Table VIII.

TABLE VIII

Exemplary 1,3-Diazabicyclo[3.1.0]-
hex-3-ene Photoreductants

| | |
|---|---|
| PR-200 | 4,6-diphenyl-1,3-diazabicyclo[3.1.0]-hex-3-ene |
| PR-201 | 4-phenyl-6-(4-nitrophenyl)-1,3-diazabicyclo[3.1.0]hex-3-ene |
| PR-202 | 2,4,6-triphenyl-1,3-diazabicyclo[3.1.0]-hex-3-ene |
| PR-203 | 2,4-diphenyl-6-(4-nitrophenyl)-1,3-diazabicyclo[3.1.0]hex-3-ene |
| PR-204 | 2,2-dicyclopropyl-4-phenyl-6-(4-nitrophenyl)-1,3-diazabicyclo[3.1.0]-hex-3-ene |
| PR-205 | 2,6-diphenyl-4-cyano-1,3-diazabicyclo[3.1.0]hex-3-ene |
| PR-206 | 2-(1-naphthyl)-4,6-di-(4-chlorophenyl)-1,3-diazabicyclo[3.1.0]hex-3-ene |
| PR-207 | 2-methyl-4-phenyl-6-(4-nitrophenyl)-1,3-diazabicyclo[3.1.0]hex-3-ene |
| PR-208 | 2-n-propyl-4-phenyl-6-(4-nitrophenyl)-1,3-diazabicyclo[3.1.0]hex-3-ene |
| PR-209 | 2-iso-propyl-4-phenyl-6-(4-nitrophenyl)-1,3-diazabicyclo[3.1.0]hex-3-ene |
| PR-210 | 2,2-dimethyl-4,6-diphenyl-1,3-diazabicyclo[3.1.0]hex-3-ene |
| PR-211 | 2,2-dimethyl-4-phenyl-6-(4-nitrophenyl)-1,3-diazabicyclo[3.1.0]hex-3-ene |
| PR-212 | 2,2-dimethyl-4-(4-nitrophenyl)-6-phenyl-1,3-diazabicyclo[3.1.0]hex-3-ene |
| PR-213 | 2,2-dimethyl-4-phenyl-6-(4-chlorophenyl)-1,3-diazabicyclo[3.1.0]hex-3-ene |
| PR-214 | 2-methyl-2-ethyl-4-phenyl-6-(4-nitrophenyl)-1,3-diazabicyclo[3.1.0]hex-3-ene |
| PR-215 | 2-methyl-2-n-propyl-4-phenyl-6-(4-nitrophenyl)-1,3-diazabicyclo[3.1.0]hex-3-ene |
| PR-216 | 2-methyl-2-tert-butyl-4-phenyl-6-(4-nitrophenyl)-1,3-diazabicyclo[3.1.0]hex-3-ene |
| PR-217 | 2,4-diphenyl-2-methyl-6-(4-nitrophenyl)-1,3-diazabicyclo[3.1.0]hex-3-ene |
| PR-218 | 2,2-diethyl-4-phenyl-6-(4-nitrophenyl)-1,3-diazabicyclo[3.1.0]hex-3-ene |
| PR-219 | 2,2-diethyl-4-phenyl-6-(3-nitrophenyl)-1,3-diazabicyclo[3.1.0]hex-3-ene |
| PR-220 | 2,2-di-n-hexyl-4,6-diphenyl-1,3-diazabicyclo[3.1.0]hex-3-ene |
| PR-221 | spiro { cyclopentane-1,2′ 4′-phenyl-6′-(4-nitrophenyl)-1′,3′-diazabicyclo-[3.1.0]hex-3-ene]} |
| PR-222 | spiro { cyclohexane-1,2′-[4′-phenyl-6′-(4-nitrophenyl)-1′,3′,diazabicyclo-[3.1.0]hex-3-ene]} |
| PR-223 | spiro { cycloheptane-1,2′-[4′-phenyl-6′-(4-nitrophenyl)-1′,3′-diazabicyclo-[3.1.0]hex-3-ene]} |
| PR-224 | spiro { cyclooctane-1,2′-[4′-phenyl-6′-(4-nitrophenyl)-1′,3′-diazabicyclo-[3.1.0]hex-3-ene]} |
| PR-225 | spiro { 1-methylcyclohexane-2,2′-[4′-phenyl-6′-(4-nitrophenyl)-1′,3′-diazabicyclo[3.1.0]hex-3-ene]} |
| PR-226 | spiro { 1-methylcyclohexane-4,2′-[4′-phenyl-6′-(4-nitrophenyl)-1′,3′-diazabicyclo[3.1.0]hex-3-ene]} |
| PR-227 | 2-(4-ethoxycarbonylphenyl)-4,6-diphenyl-1,3-diazabicyclo[3.1.0]hex-3-ene |
| PR-228 | 2,4-diphenyl-6-(benzoyloxyphenyl)-1,3-diazabicyclo[3.1.0]hex-3-ene |
| PR-229 | 2,6-di(1-naphthyl)-4-nitro-1,3-diazabicyclo[3.1.0]hex-3-ene |
| PR-230 | 2,6-di(4-nitrophenyl)-4-phenyl-1,3-diazabicyclo[3.1.0]hex-3-ene |
| PR-231 | 2,4-diphenyl-6-(3-nitrophenyl)-1,3-di azabicyclo[3.1.0]hex-3-ene |
| PR-232 | 2,6-diphenyl-4-(4-nitrophenyl)-1,3-diazabicyclo[3.1.0]hex-3-ene |
| PR-233 | 2-(4-tolyl)-4-phenyl-6-(4-nitrophenyl)-1,3-diazabicyclo[3.1.0]hex-3-ene |
| PR-234 | 2,6-di(4-tolyl)-4-phenyl-1,3-diazabicyclo[3.1.0]hex-3-ene |
| PR-235 | 2,4,6-tri(2-aminophenyl)-1,3-diazabicyclo[3.1.0]hex-3-ene |
| PR-236 | 2-(4-diethylaminophenyl)-4,6-diphenyl-1,3-diazabicyclo[3.1.0]hex-3-ene |
| PR-237 | 2,4-diphenyl-6-(4-morpholinophenyl)-1,3-diazabicyclo[3.1.0]hex-3-ene |
| PR-238 | 2-benzyl-4-nitro-6-phenyl-1,3-diazabicyclo[3.1.0]hex-3-ene |
| PR-239 | 2,4-diphenyl-6-(4-ethylphenyl)-1,3-diazabicyclo[3.1.0]hex-3-ene |
| PR-240 | 2,4-diphenyl-6-(4-nitrophenyl)-1,3-diazabicyclo[3.1.0]hex-3-ene |
| PR-241 | 1-azonia-4,6-diphenyl-1-methyl-3-azabicyclo[3.1.0]hex-3-ene tetrafluoroborate |
| PR-242 | 1-azonia-4,6-diphenyl-1,2,2-trimethyl-3-azabicyclo[3.1.0]hex-3-ene hexafluorophosphate |
| PR-243 | 1-azonia-4-phenyl-6-(4-nitrophenyl)-1,2,2-trimethyl-3-azabicyclo[3.1.0]hex-3-ene tetrafluoroborate |
| PR-244 | 1-azonia-4-nitro-2,6-diphenyl-3-azabicyclo[3.1.0]hex-3-ene chloride |
| PR-245 | 4,6-diphenyl-1,3-diazabicyclo[3.1.0]hex-3-ene-1-oxide |
| PR-246 | 2,2-dimethyl-6-(4-nitrophenyl)-4-phenyl-1,3-diazabicyclo[3.1.0]hex-3-ene-1-oxide |
| PR-247 | spiro { cyclopentane-1,2′-[4′-phenyl-6′-(4-nitrophenyl)-1′,3′-diazabicyclo-[3.1.0]hex-3-ene-1-oxide]} |
| PR-248 | spiro { 1-methylcyclohexane-4,2′-[2′,4′,6′-triphenyl-1′,3′-diazabicyclo[3.1.0]hex-3-ene-1-oxide]} |
| PR-249 | spiro { 1-cycloheptane-1,2′-[2′,2′-dicyclopropyl-4′,6′-di(4-nitrophenyl)-1′,3′-diazabicyclo[3.1.0]hex-3-ene-1-oxide]} |

COMPOSITIONS, LAYERS, ELEMENTS AND PROCESSES FOR THEIR USE

To form a radiation-sensitive composition useful in the present invention I merely bring together the photoreductant and the tetrazolium salt in the presence of labile hydrogen atoms, if required by the photoreductant chosen. The radiation-sensitive composition can then be brought into a spacially fixed relationship, as by coating the composition onto a support to form a photographic element according to the present invention. For maximum efficiency of performance it is preferred that the components of the radiation-sensitive composition, particularly, the photoreductant, the tetrazolium salt and the external hydrogen source, if any, be intimately associated. This can be readily achieved, for example, by dissolving the reactants in a solvent system.

The solvent system can be a common solvent or a combination of miscible solvents which together bring all of the reactants into solution. Typical preferred solvents which can be used alone or in combination are lower alkanols, such as methanol, ethanol, isopropanol, t-butanol and the like; ketones, such as methylethyl ketone, acetone and the like; water; liquid hydrocarbons; chlorinated hydrocarbons, such as chloroform, ethylene chloride, carbon tetrachloride and the like; ethers, such as diethyl ether, tetrahydrofuran, and the like; acetonitrile; dimethyl sulfoxide and dimethyl formamide.

For ease of coating and for the purposes of imparting strength and resilience to a radiation-sensitive layer it is generally preferred to disperse the radiation-sensitive reactants in a resinous polymer matrix or binder. A wide variety of polymers can be used as binders. In order to be useful it is only necessary that the binders be chemically compatible with the radiation-sensitive reactants. In addition to performing their function as a binder the polymers can also serve as external hydrogen sources to supplement or replace other hydrogen sources as described above. For example, many of the polymers set forth in Table VII can be used both as binders and as external hydrogen sources.

It is preferred to employ linear film-forming polymers such as, for example, cellulose compounds, such as ethyl cellulose, butyl cellulose, cellulose acetate, cellulose triacetate, cellulose butyrate, cellulose acetate butyrate and the like; vinyl polymers, such as poly(vinyl acetate), poly(vinylidene chloride), a poly(vinyl acetal) such as poly(vinyl butyral), poly(vinyl chloride-co-vinyl acetate), polystyrene, and polymers of alkyl acrylates and methacrylates including copolymers incorporating acrylic or methacrylic acid; and polyesters, such as poly(ethylene glycol-co-isophthalic acid-co-terephthalic acid), poly(p-cyclohexane dicarboxylic acid-co-isophthalic acid-co-cyclohexylenebismethanol), poly(p-cyclohexanedicarboxylic acid-co-2,2,4,4-tetramethylcyclobutane-1,3-diol) and the like. The condensation product of epichlorohydrin and bisphenol is also a preferred useful binder. Generally any binder known to have utility in photographic elements and, particularly, diazo photographic elements can be used in the practice of this invention. These binders are well known to those skilled in the art so that no useful purpose would be served by including an extensive catalogue of representative binders in this specification. Any of the vehicles disclosed in *Product Licensing Index* Vol. 92, December 1971, publication 9232, at page 108, can be used as binders in the photographic elements of this invention.

While the proportions of the reactants forming the radiation-sensitive layer of a photographic element can be varied widely, it is generally preferred for most efficient utilization of the reactants that they be present in roughly stoichiometric concentrations--that is, equal molar concentrations. One or more of the reactants can, of course, be present in excess. For example, where the external hydrogen source is also used as a binder, it is typically present in a much greater concentration than is essential merely for donation of labile hydrogen atoms. It is generally preferred to incorporate from 0.1 to 10 moles of the tetrazolium salt per mole of the photoreductant. External hydrogen sources supplied solely to perform this function are typically conveniently incorporated in concentrations of from 0.5 to 10 moles per mole of photoreductant. Where a metal is added for the purpose of chelating the formazan dye, it is preferably incorporated in a proportion of from 0.1 to 10 moles per mole of tetrazolium salt. The binder can account for up to 99% by weight of the radiation-sensitive layer, but is typically employed in proportions of from 50 to 90% by weight of the radiation-sensitive layer. It is, of course, recognized that the binder can be omitted entirely from the radiation-sensitive layer. The surface or areal densities of the reactants can vary as a function of the formazan dyes formed and the image densities desired. It is generally preferred to incorporate the tetrazolium salt in a concentration of at least $2 \times 10^{-6}$ moles per square decimeter and, most preferably, in a concentration of from $4 \times 10^{-6}$ to $6 \times 10^{-6}$ moles per square decimeter. The areal densities of the remaining reactants are, of course, proportionate. Typically the radiation-sensitive layer can vary widely in thickness depending on the characteristics desired for the photographic element—e.g., image density, flexibility, transparency, etc. For most photographic applications coating thicknesses in the range of from 2 microns to 20 microns are preferred.

Any conventional photographic support can be used in the practice of this invention. Typical supports include transparent supports, such as film supports and glass supports as well as opaque supports, such as metal and photographic paper supports. The support can be either rigid or flexible. Preferred photographic supports for most applications are paper or film supports. The support can incorporate one or more subbing layers for the purpose of altering its surface properties. Typically subbing layers are employed to enhance the adherency of the radiation-sensitive coating to the support. Suitable exemplary supports are disclosed in *Product Licensing Index* Vol. 92, December 1971, publication 9232, at page 108.

The radiation-sensitive layer can be formed on the support using any conventional coating technique. Typically the reactants, the binder (if employed) and any other desired addenda are dissolved in a solvent system and coated onto the support by such means as whirler coating, brushing, doctor blade coating, hopper coating and the like. Thereafter the solvent is evaporated. Other exemplary coating procedures are set forth in the *Product Licensing Index* publication cited above, at page 109. Coating aids can be incorporated into the coating composition to facilitate coating as disclosed on page 108 of the *Product Licensing Index* publication. It is also possible to incorporate antistatic layers and/or matting agents as disclosed on this page of the *Product Licensing Index* publication.

It is a distinct advantage of this invention that the photographic elements can be processed in a dry state using commercially available exposure and processing equipment. Exposure to actinic radiation in the ultraviolet or visible portions of the spectrum can be readily achieved using mercury arc lamps, carbon arc lamps, photoflood lamps, lasers and the like. Negative images can be formed by exposure through a positive stencil or transparency while positive images can be formed by exposure through a negative stencil or transparency.

To avoid direct printout on exposure with the consequent necessity of fixing, where uniform re-exposure to actinic radiation is contemplated and a base activated reducing agent precursor is to be formed, the radiation-sensitive layer is maintained significantly less basic than is required to convert the reducing agent precursor to the reducing agent. While the exact degree of permissible basicity of the radiation-sensitive layer will vary somewhat as a function of the specific reactants chosen, it is generally preferred to avoid the incorporation of strongly basic reactants in the radiation-sensitive layer. For this reason components of the radiation-sensitive layer are chosen to be free of strongly basic moieties. It is preferred, for maximum protection against premature and/or background printout, that the radiation-sensitive layer be maintained neutral or on the acid side of neutrality. These considerations do not apply, of course, where a photoreductant, such as an aziridene, is employed which produces a reducing agent precursor that is thermally rather than base activated to form a reducing agent.

Where photoreductants are employed which are converted to base activated reducing agent precursors, such as those set forth in Tables III, IV and VII, the latent image that is produced in the photographic element on exposure is easily developed using gaseous ammonia processors, such as those which release moist ammonia vapors at ambient pressure or those which use high pressure anhydrous ammonia gas. Other volatile bases, such as methyl amine, dimethyl amine, trimethyl amine, ethyl amine, diethyl amine, triethyl amine, propyl amine, butyl amine, etc., can be used. Although wet processing is not preferred, it is also contemplated that the photographic elements of this invention can be developed using aqueous alkaline solutions. It is contemplated that the radiation-sensitive layer or an adjacent layer of the photographic element can contain a base source which is convertible to a base at will. For example, it is contemplated that the radiation-sensitive layer can contain a compound that will release ammonia on exposure to heat or other activating energy.

Where a 2H-benzimidazole is being employed as the photoreductant the reducing agent is formed directly on exposure and no additional processing is required to produce a formazan dye image. The photographic elements incorporating a 2H-benzimidazole can be conveniently fixed against background printout after imagewise exposure merely by increasing the temperature of the photographic element sufficiently to convert the 2H-benzimidazole to the corresponding 1H-benzimidazole, which is not a reducing agent. Temperatures in the range of from 100° to 150°C are generally preferred for heat fixing. Where the element will not again be exposed to actinic radiation in use or where it is desired to retain in the element the capability of additional image recording, the step of thermally fixing the element can be omitted. It is recognized that in using any of the photoreductants employed in the practice of this invention it can be desirable to heat the photographic element into the 100° to 150° temperature range.

Where a 1,3-diazabicyclo[3.1.0]hex-3-ene is employed as a photoreductant, exposure of the photographic element causes it to be converted to the corresponding ene diimine reducing agent precursor. To convert the reducing agent precursor to a reducing agent and thereby convert the latent image which it represents into a visible image it is only necessary to heat the radiation-sensitive layer to a temperature somewhat above ambient. A temperature of from about 100°C to 150°C is preferred.

If the imaged photographic element is re-exposed to actinic radiation at room temperature, there is little tendency for background printout to occur. This is partially attributable to the fact that the rate of conversion of the reducing agent precursor to the reducing agent is low at room temperature. Additionally, since the 1,3-bicyclo[3.1.0]hex-3-enes employed in the practice of this invention are photochromic, there is a spontaneous reversion of a portion of the reducing agent precursor to photoreductant with the passage of time. Hence, the photographic elements incorporating these photoreductants do not require fixing. Where even minimal background printouts are undersirable, mineral acid fuming, washing or swabbing can be undertaken to remove residual 1,3-bicyclo[3.1.0]hexenes.

This invention is further illustrated by the following examples of preferred embodiments.

EXAMPLES 1 and 2 a series of films were prepared as follows: A coating composition was prepared using 65 g. of acetonitrile, 25 g of methanol, 10 g of cellulose acetate butyrate binder and 1.26 g of 2-(1-hydroxyethyl)-5-methyl-1,4-benzoquinone (PR-152). Five grams of this coating composition were added to 0.002 mole of the tetrazolium salt, an the mixture was agitated to effect solution. Using a 150 micron coating blade each composition was coated on 100 micron poly(ethylene-terephthalate) film support. Contact exposure for 8 sec. on an exposure unit commercially available under the tradename IBM Microcopier II was followed by development with anhydrous ammonia at 75 psi. Listed in Table IX are comparative observations of coatings identically prepared, exposed and processed, except for the tetrazolium salt incorporated. The tetrazolium salts not included within this invention which were included in the coatings for purposes of comparison are as follows: Control 1— 2-(4-nitrophenyl)-3,5-diphenyl-2H-tetrazolium tetrafluoroborate; Control 2— 2(4-nitrophenyl)-3-phenyl-5-(4-chlorophenyl)-2H-tetrazolium tetrafluoroborate; Control 3— 2-(4-nitrophenyl)-3-(4-iodophenyl)-5-phenyl-2H-tetrazolium tetrafluoroborate; Control 4— 2-(2-methoxyphenyl)-3-phenyl-5-(4-nitrophenyl)-2H-tetrazolium tetrafluoroborate; and Control 5— 2-(4-methoxyphenyl)-3-(4-nitrophenyl)-5-phenyl-2H-tetrazolium tetrafluoroborate.

TABLE IX

Absorption Characteristics Resulting From Variously Substituted Tetrazolium Salts

| Example No. | Tetrazolium Salt | λmax | In Ethyl Acetate A600nm** |
|---|---|---|---|
| Control | Control 1 | 475 | 0.1 |
| Control | Control 2 | 482 | 0.1 |
| Control | Control 3 | 490 | 0.1 |
| Control | Control 4 | 485 | 0.1 |
| Control | Control 5 | 475 | 0.1 |
| 1 | T-10 | 498 | 0.4 |
| 2 | T-8 | 490 | 0.2 |

**Absorption of dye formed on exposure above 600 nm, measured in optical density units.

From Table IX it is apparent that higher optical densities are obtained where the formazan dye contains an alkoxy group in the meta or para substitution position of a phenyl group in the 5-position with respect to the tetrazole nucleus. It is further apparent that the highest absorption wavelength maximum is obtained with the dialkoxy substitution pattern of Example 1. Further, in Example 2 the wavelength of the absorption maximum exceeds or equals that obtained with the control coatings incorporating tetrazolium salts not conforming to this invention.

EXAMPLES 3 THROUGH 13

The procedures of Examples 1 and 2 were repeated employing other specific tetrazolium salts of the invention. In addition the densities of dye images were measured using neutral, red, green and yellow light. The images developed in the coatings were tested for fading by placing the photographic elements on a desk top beneath three GE F400W Cool White fluorescent lights. 280 ± 20 ft-candles of incident light were being received by the photographic elements. The half-life reported in Table X is the time elapsed before the dye had irreversibly faded to destory one-half of the formazan dye initially present, as determined by optical density measurements.

It is apparent that each of the formazan dyes produced in these examples exhibited a maximum wavelength of absorption greater than 500nm and greater than any of the maximum wavelengths of absorption of the controls employed. Further the absorption above 600 nanometers was in each instance much higher than for the controls employed. Further it can be seen that the stabilities of the formazan days are improved as the summed Hammett sigma values increase.

TABLE X

Effects of Substituents on Dye Absorption and Stability

| Example No. | Tetrazolium Salt | In ethyl acetate | | Densities | | | | Half-Life (days) | Summed Hammet Sigma Values |
|---|---|---|---|---|---|---|---|---|---|
| | | $\lambda$max | A600 nm | $D_u$ | $D_r$ | $D_r$ | $D_u$ | | |
| 3 | T-11 | 518 | 0.6 | 1.28 | 1.10 | 0.25 | N.R. | 0.6 | .37 |
| 4 | T-24 | 523 | 0.7 | N.R. | N.R. | N.R. | N.R. | N.R. | ~.45 |
| | T-12 | 530 | 0.9 | N.R. | N.R. | N.R. | N.R. | N.R. | .29 |
| 5 | | | | | | | | | |
| 6 | T-13 | 515 | 1.1 | 0.78 | 1.62 | N.R. | N.R. | 0.8 | .21 |
| 7 | T-16 | 525 | 1.1 | 0.78 | 2.30 | 0.87 | N.R. | 25 | 1.20 |
| 8 | T-17 | 533 | 1.2 | 0.86 | 2.20 | 1.03 | 1.63 | 50 | 1.35 |
| 9 | T-18 | 545 | 1.5 | 0.70 | 1.50 | 1.09 | 1.41 | 120 | 1.48 |
| 10 | T-19 | 507 | 0.6 | 0.88 | 1.76 | N.R. | N.R. | 32 | 1.07 |
| 11 | T-20 | 550 | 1.5 | 1.10 | 2.65 | 1.45 | N.R. | 25 | 1.40 |
| 12 | T-25 | 520 | 0.8 | 1.01 | 1.45 | 1.50 | N.R. | 60 | ~1.15 |
| 13 | T-15 | 550* | N.R. | N.R. | N.R. | N.R. | N.R. | N.R. | ~1.56 |

N.R. = No value available to report
*Measured in photographic element

The invention has been described with particular reference to preferred embodiments thereof, but it will be understood that variations and modifications can be effected within the spirit and scope of this invention.

I claim:

1. A composition of matter comprising
    means for providing labile hydrogen atoms,
    means for generating, by molecular photolysis or photo-induced rearrangement, a reducing agent for tetrazolium salts or a compound which will form a reducing agent for tetrazolium salts only when activated by a base or by heat, and
    a tetrazolium salt capable of reduction to a formazan dye including
    a. as a 5-position substituent a benzene ring attached to the tetrazole nucleus having at least one meta or para alkyl or alkoxy substituent and
    b. 2- and 3-position tetrazole nucleus substituents which are, collectively, predominantly electronegative.

2. A composition of matter according to claim 1 in which said meta or para substituent includes an alkyl moiety of from 1 to 6 carbon atoms.

3. A composition of matter according to claim 1 in which said alkoxy substituent is a 3,4-dioxyalkylene substituent.

4. A composition of matter according to claim 1 in which said tetrazolium salt includes dye stabilizing tetrazole nucleus substituents which are, collectively, predominantly electronegative so that the algebraic sum of the Hammett sigma values of the tetrazole nucleus substituents are
    a. in excess of 0.78 or
    b. in excess of 0.40 when said tetrazole nucleus is provided with a ring substituent bonded to said tetrazole nucleus at a first ring position and including a single substituent ortho to said first ring position.

5. A composition of matter according to claim 1 in which said generating means is a quinone.

6. A composition of matter according to claim 5 in which said quinone incorporates one or more labile hydrogen atoms capable of converting said quinone to a base activatible reducing agent precursor on exposure to actinic radiation, said labile hydrogen atoms being attached to a carbon which is also bonded to the oxygen atom of an oxy substituent or the nitrogen atom of an amine substituent with the further provision that the carbon to hydrogen bond is the third or fourth bond removed from at least one carbonyl quinone bond.

7. A composition of matter according to claim 1 wherein said providing means is a material which incorporates a labile hydrogen atom attached to carbon atom which is also bonded to the oxygen atom of an oxy substituent or the nitrogen atom of an amine substituent.

8. A composition of matter according to claim 1 in which said 2- and 3-position tetrazole nucleus substituents are both predominantly electronegatively substituted.

9. A composition of matter according to claim 8 in which the summed sigma values of said 2- and 3-position tetrazole nucleus substituents are each predominantly electronegatively substituted and the difference in the summed sigma values of said 2- and 3-position tetrazole nucleus substituents is less than 0.5.

10. A photographic element comprising
    a support and
    at least one radiation-sensitive image-recording layer thereon comprised of
    means for providing labile hydrogen atoms,
    means for generating, by molecular photolysis or photo-induced rearrangement, a reducing agent for tetrazolium salts or a compound which will form a reducing agent for tetrazolium salts only when activated by a base or by heat, and
    a tetrazolium salt capable of reduction to a formazan dye including
    a. as a 5-position substituent a benzene ring attached to the tetrazole nucleus having at lease one meta or para alkyl or alkoxy substituent and
    b. 2- and 3-position tetrazole nucleus substituents which are, collectively, predominantly electronegative.

11. A photographic element according to claim 10 in which said meta or para substituent includes an alkyl moiety of from 1 to 6 carbon atoms.

12. A photographic element according to claim 10 in which said alkoxy substituent is a 3,4-dioxyalkylene substituent.

13. A photographic element according to claim 10 in which said tetrazolium salt includes dye stabilizing tetrazole nucleus substituents which are, collectively, predominantly electronegative so that the algebraic sum of the Hammett sigma values of the tetrazole nucleus substituents are
   a. in excess of 0.78 or
   b. in excess of 0.40 when said tetrazole nucleus is provided with a ring substituent bonded to said tetrazole nucleus at a first ring position and including a single substituent ortho to said first ring position.

14. A photographic element according to claim 10 in which said generating means is a quinone.

15. A photographic element according to claim 14 in which said quinone incorporates one or more labile hydrogen atoms capable of converting said quinone to a base activatible reducing agent precursor on exposure to actinic radiation, said labile hydrogen atoms being attached to a carbon which is also bonded to the oxygen atom of an oxy substituent or the nitrogen atom of an amine substituent with the further provision that the carbon to hydrogen bond is the third or fourth bond removed from at least one carbonyl quinone bond.

16. A photographic element according to claim 10 wherein said providing means is a material which incorporates a labile hydrogen atom attached to carbon atom which is also bonded to the oxygen atom of an oxy substituent or the nitrogen atom of an amine substituent.

17. A photographic element according to claim 10 in which said 2- and 3-position tetrazole nucleus substituents are both predominantly electronegatively substituted.

18. A photographic element according to claim 10 in which the summed sigma values of said 2- and 3-position tetrazole nucleus substituents are each predominantly electronegatively substituted and the difference in the summed sigma values of said 2- and 3-position tetrazole nucleus substituents is less than 0.5.

19. A image-recording process for imaging an element comprising
   means for generating, by molecular photolysis or photo-induced rearrangement, a reducing agent for tetrazolium salts or a compound which will form a reducing agent for tetrazolium salts only when activated by a base or by heat, and means for providing labile hydrogen atoms, the process comprising the steps of
   converting the generating means within a selected areal portion of the element to a reducing agent precursor by imagewise exposing the generating means to actinic radiation,
   activating the precursor with a base to form a reducing agent and
   reducing to a formazan dye having a maximum absorption at a wavelength longer than 500 nm, a tetrazolium salt in the element which includes, as a 5-position substituent, a benzene ring attached to the tetrazole nucleus having at least one meta or para alkyl or alkoxy substituent, and
   2- and 3-position tetrazole nucleus substituents which are both predominantly electronegatively substituted.

20. An image-recording process according to claim 19 in which the base is employed in its gaseous phase.

21. An image-recording process according to claim 20 in which the base is ammonia.

* * * * *

UNITED STATES PATENT AND TRADEMARK OFFICE
CERTIFICATE OF CORRECTION

PATENT NO. : 3,917,484
DATED : November 4, 1975
INVENTOR(S) : David S. Bailey

It is certified that error appears in the above-identified patent and that said Letters Patent are hereby corrected as shown below:

Column 4, line 9, "ae" should read --are--; line 58, "algebriac" should read --algebraic. Column 5, line 15, "conjunction" should read --conjugation--. Column 6, line 14, that part of formula reading "2-tetrazolium" should read --2H-tetrazolium--; lines 24-25, "tetrafluororate" should read --tetrafluoroborate--; line 51, "aagent" should read --agent--. Column 9, line 11, "and substituents" should read --and substituent--. Column 10, Table V, PR-118, that part of formula reading "(2,2" should read --2,2--; line 16, that part of formula reading "nitroakyl" should read --nitroalkyl--. Column 11, line 26, "Compound" should read --Compounds-- and should be flush with the left margin since it begins a sentence which is a continuation of the last paragraph in column 10. Column 12, line 4, "provides" should read --produce--. Column 15, line 2, "bezamido" should read --benzamido--; line 50, that part of formula reading "1,2'4'" should read --1,2'[4'--; line 53, that part of formula reading "1',3',diazabicyclo" should read --1',3'-diazabicyclo--. Column 19, line 64, "undersirable" should read --undesirable--. Column 20, line 2, "a" should read --A--. Column 21, line 10, "days" should read --dyes--; Table X, under Example No., "5" should be directly under 4 and on the same line horizontally with T-12, etc., and there should be no space between that line and the line beneath.

Signed and Sealed this twentieth Day of April 1976

[SEAL]

Attest:

RUTH C. MASON
Attesting Officer

C. MARSHALL DANN
Commissioner of Patents and Trademarks